US005734331A

United States Patent [19]

Makino

[11] Patent Number: 5,734,331

[45] Date of Patent: Mar. 31, 1998

[54] INPUT CONTROL FOR RADIO SELECTIVE CALLING RECEIVER

[75] Inventor: Tetuya Makino, Shizuoka, Japan

[73] Assignee: NEC Corporation, Tokyo, Japan

[21] Appl. No.: 687,038

[22] Filed: Jul. 25, 1996

[30] Foreign Application Priority Data

Jul. 26, 1995 [JP] Japan .................................... 7-190310

[51] Int. Cl.[6] .................................................. H04Q 1/00

[52] U.S. Cl. .......................................... 340/825.44; 341/24

[58] Field of Search ......................... 340/825.44, 825.36; 455/38.1; 341/24

[56] References Cited

U.S. PATENT DOCUMENTS

| | | | |
|---|---|---|---|
| 3,976,995 | 8/1976 | Sebestyen | 340/825.44 |
| 4,536,761 | 8/1985 | Tsunoda | 340/825.44 |
| 4,639,726 | 1/1987 | Ichikawa | 340/825.44 |
| 4,786,902 | 11/1988 | Davis | 340/825.44 |
| 5,173,688 | 12/1992 | DeLuca et al. | 340/825.44 |
| 5,430,440 | 7/1995 | Shim | 340/825.44 |
| 5,650,776 | 7/1997 | Mitchell | 340/825.44 |

*Primary Examiner*—Brian Zimmerman
*Attorney, Agent, or Firm*—Sughrue, Mion, Zinn, Macpeak & Seas, PLLC

[57] ABSTRACT

A selective calling receiver includes a keypad for inputting an instruction according to a user's manual operation and a detector for detecting an incoming call addressed to the selective calling receiver itself. A notifying circuit notifies reception of the incoming call to a user through sound, light, and/or vibration. When the incoming call is detected, a control processor transfers control to an incoming call notifying routine and, at the same time, ignores the instruction received from the keypad during a predetermined time period immediately after the incoming call has been detected. After the predetermined time period has passed, the instruction due to the user's manual operation is enabled again.

17 Claims, 4 Drawing Sheets

INPUT CONTROL FOR RADIO SELECTIVE CALLING RECEIVER

BACKGROUND OF THE INVENTION

1. Field of the invention

The present invention generally relates to a radio selective calling receiver, and in particular to a method and system for informing the user of an incoming call with reliability.

2. Description of the Related Art

A selective calling receiver has been widely used for various purposes and, especially, a small-sized and light-weight selective calling receiver called a pager is suitable for being taken on the road. A basic function of the selective calling receiver is to indicate by beep sound, vibration, or light the incoming call and then to display a received message on an liquid-crystal display (LCD) according to the user's key operation. Since the incoming call notifying function has the highest priority, the interrupt of the incoming call can occur in the middle of performing another function. Further, in order to save space, a plurality of operation modes usually share the use of the same key.

Since any incoming call occurs suddenly, however, the user cannot know in advance when an incoming call occurs, resulting in a problem of operability as follows.

As showing in FIG. 1, assuming that the user is setting a time-of-day clock by pressing a key again and again. Each time the key is pressed in a time setting mode, the number of the minute digit, for example, is incremented. When an incoming call occurs, however, control is forced to be transferred to the incoming call notifying mode in the progress of setting the time-of-day clock. In cases where the use of that key is shared, the notifying routine is progressed unless the user stops pressing the key. More specifically, referring to FIG. 1, when the user presses the key just after the incoming call has occurred, the beeping sound is reset. On subsequently pressing the key several times, a received message is read and displayed on the LCD, and then the operation state is changed to a stand-by state after all the message has been displayed. Such a sequence may give the user the impression that an initial stand-by screen suddenly appears due to some mistake.

SUMMARY OF THE INVENTION

An object of the present invention is to provide a radio selective calling receiver and its control method which permit the user to control the incoming call notifying process with reliability.

Another object of the present invention is to provide a control method which achieves reliable operability even when an incoming call suddenly occurs in the middle of the user's key operation.

According to the present invention, any instruction due to the user's manual operation is ignored during a predetermined time period just after an incoming call occurs. More specifically, a selective calling receiver according to the present invention is provided with an input means for inputting an instruction according to a user's manual operation and a detector for detecting an incoming call from a selective calling signal, the incoming call being addressed to the selective calling receiver itself. Further, the selective calling receiver is provided with a notifying circuit and a controller. The notifying circuit notifies reception of the incoming call to a user through at least one predetermined medium such as sound, light, and/or vibration. The controller ignores the instruction received from the input means during a predetermined time period immediately after the incoming call has been detected.

The controller is preferably implemented by a base program stored in a program memory. The program memory further stores a plurality of function programs one of which is executed in accordance with the user's manual operation. The input means comprises a plurality of keys including at least one key which is shared by a plurality of programs among the base program and the function programs.

The selective calling receiver is further provided with an interrupt controller and a receiver controller. The interrupt controller assigns a higher priority to a first interrupt of the incoming call than a second interrupt of the instruction and ignoring the second interrupt of the instruction until a predetermined time period has elapsed immediately after the incoming call has been detected. The receiver controller activates the notifying circuit from when the incoming call is detected until the second interrupt of the instruction first occurs after the predetermined time period has elapsed.

Preferably, the receiver controller controls the notifying circuit such that a message including in the incoming call is displayed on screen when the second interrupt of the instruction secondly occurs after the predetermined time period has elapsed.

According to another aspect of the present invention, when the incoming call is detected, control is changed from a first operation mode determined by the instruction to a second operation mode which provides a first step such that the incoming call is notified to a user through a predetermined medium. At the same time, the instruction due to the user's manual operation is ignored until a predetermined time period has elapsed immediately after the incoming call is detected, and the first step is performed from when the incoming call is detected until the instruction first occurs after the predetermined time period has elapsed. Preferably, the second operation mode provides a second step of displaying a message including in the incoming call on screen when the instruction secondly occurs after the predetermined time period has elapsed.

As described above, according to the present invention, the user's manual operation is ignored for a predetermined time period after an incoming call is detected. Therefore, the user's misoperation is effectively prevented even When an incoming call suddenly occurs. In addition, the user can confirm the occurrence of the incoming call before manually operating the input means to stop the notifying circuit working and display the received message on screen. In other words, the incoming call notifying process is progressed by the user with reliability.

DETAILED DESCRIPTION OF THE PREFERRED EMBODIMENTS

Figure 1:
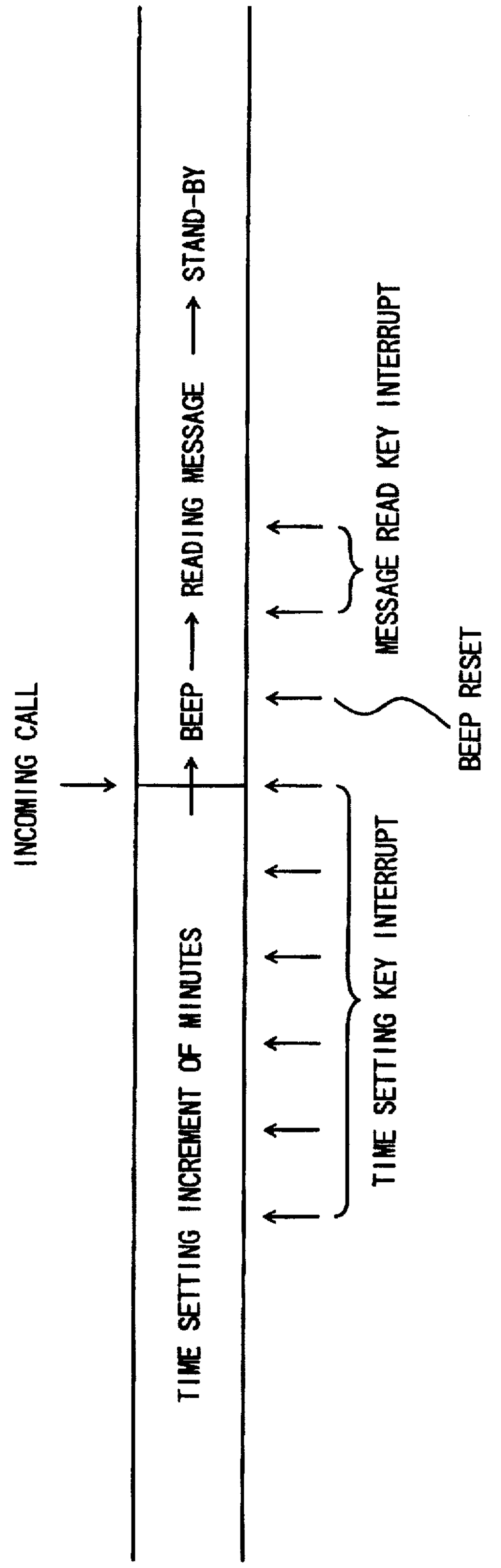
FIG. 1 (PRIOR ART)
FIG. 1 is a time chart showing an example of the operation of a conventional radio selective calling receiver.
Figure 2:
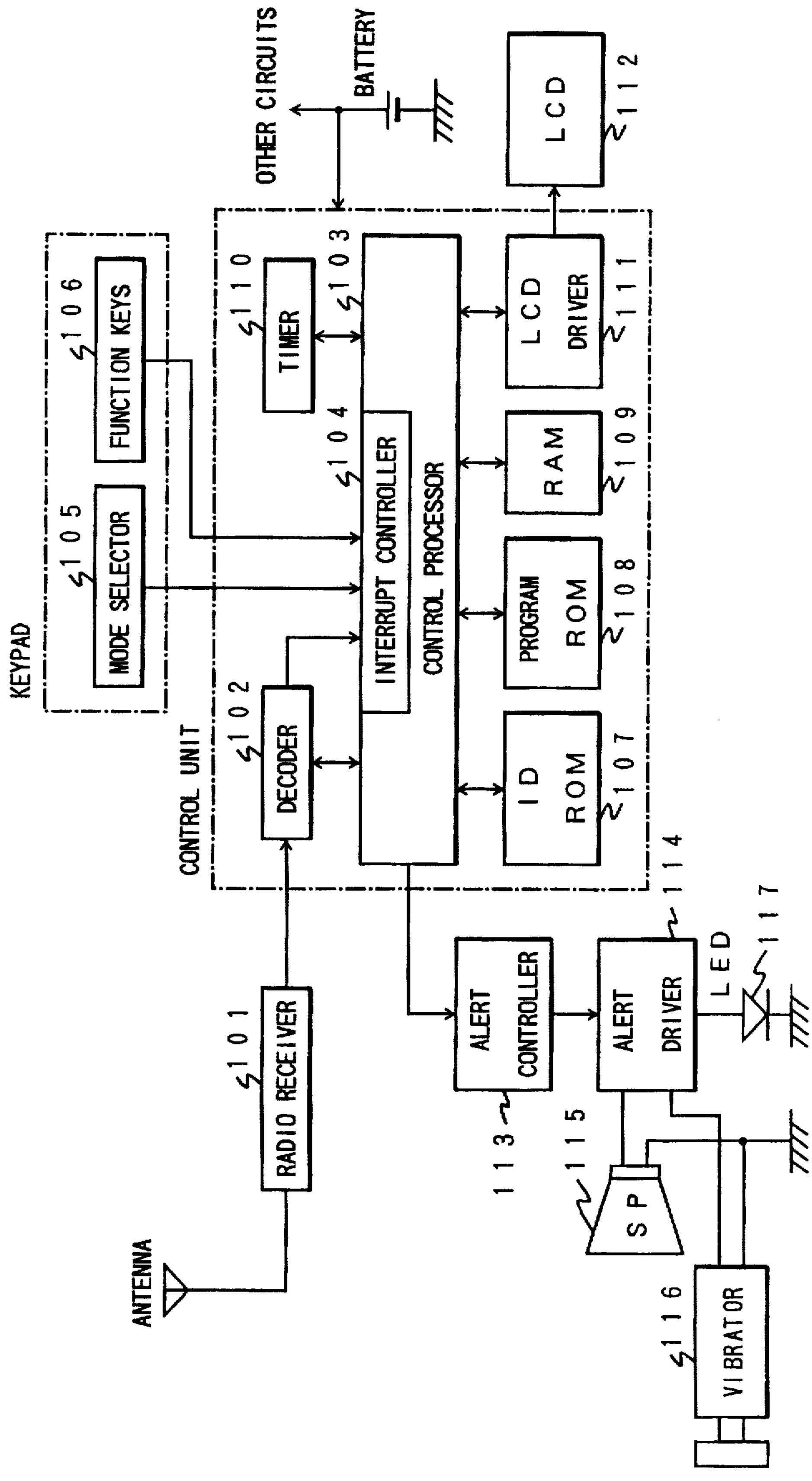
FIG. 2 is a block diagram showing a radio selective calling receiver according to an embodiment of the present invention.

Referring to FIG. 1, there is shown a selective calling receiver in accordance with the present invention. The selective calling receiver is comprised of a radio system and a control unit which is connected to a battery, a key pad, a liquid-crystal display (LCD), and an alert circuit. The radio system is comprised of a built-in antenna and a radio receiver 101. The receiver 101 receives an FSK (Frequency Shift Keying)-modulated radio signal from a radio base station (not shown) of a selective calling system through the antenna. The receiver 101 further includes an FSK demodulator which demodulates the received radio signal into a baseband signal. After the waveform of the baseband signal is shaped, the wave-shaped signal is transferred as a selective calling signal from the radio receiver 101 to a decoder 102. The decoder 102 receives the selective calling signal from the radio receiver 101 and decodes it into received data. In this embodiment, the decoder 102 further compares the selective calling number included in the received data with the identification (ID) number previously stored in an ID ROM 107 under the control of a control processor 103. When the selective calling number included in the received data is identical to the ID number, the decoder 102 outputs a message included in the received data to the control processor 103.

The control processor 103 receives not only the received message from the decoder 102 but also user's key instructions from a key pad including a mode selector 105 and other function keys 106. As described before, a plurality of operation modes share the use of the same key for space-saving. The control processor 103 implements an interrupt controller 10 based on the operating program. The interrupt controller 104, as described later, assigns the top priority to the interrupt request of the decoder 102 for the received message processing. The operating program, other function programs, and fonts for display on screen are stored in a program read-only memory (ROM) 108.

When the interrupt for the message reception occurs, the interrupt controller 104 ignores user's key instructions received from the keypad for a predetermined time period. At the same time, the received message is stored onto a random access memory (RAM) 109 and the alert circuit is activated according to a selected informer mode. The control processor 103 uses a timer 110 to check whether a lapse of time reaches the predetermined time period during which the user's key instructions are ignored as described in detail later.

By the user pressing a function key in a message read mode, the control processor 103 reads the message from the RAM 109 and controls the LCD driver 111 using the font stored in the program ROM 107 so that the message is displayed on the LCD 112. When the interrupt for the message reception occurs, the control processor 103 controls the alert controller 113 so that a selected alert device is activated. More specifically, if the user selects a beep mode, the alert controller 113 controls an alert driver 114 so that a speaker 115 makes a beep and an light-emitting diode (LED) 117 blinks. If a silent mode is selected, a vibrator 116 generates mechanical vibrations and the LED 117 blinks.

An interrupt control method according to the present invention will be described hereinafter in the case where the user is setting a time-of-day clock by pressing a certain function key again and again.

Figure 3:
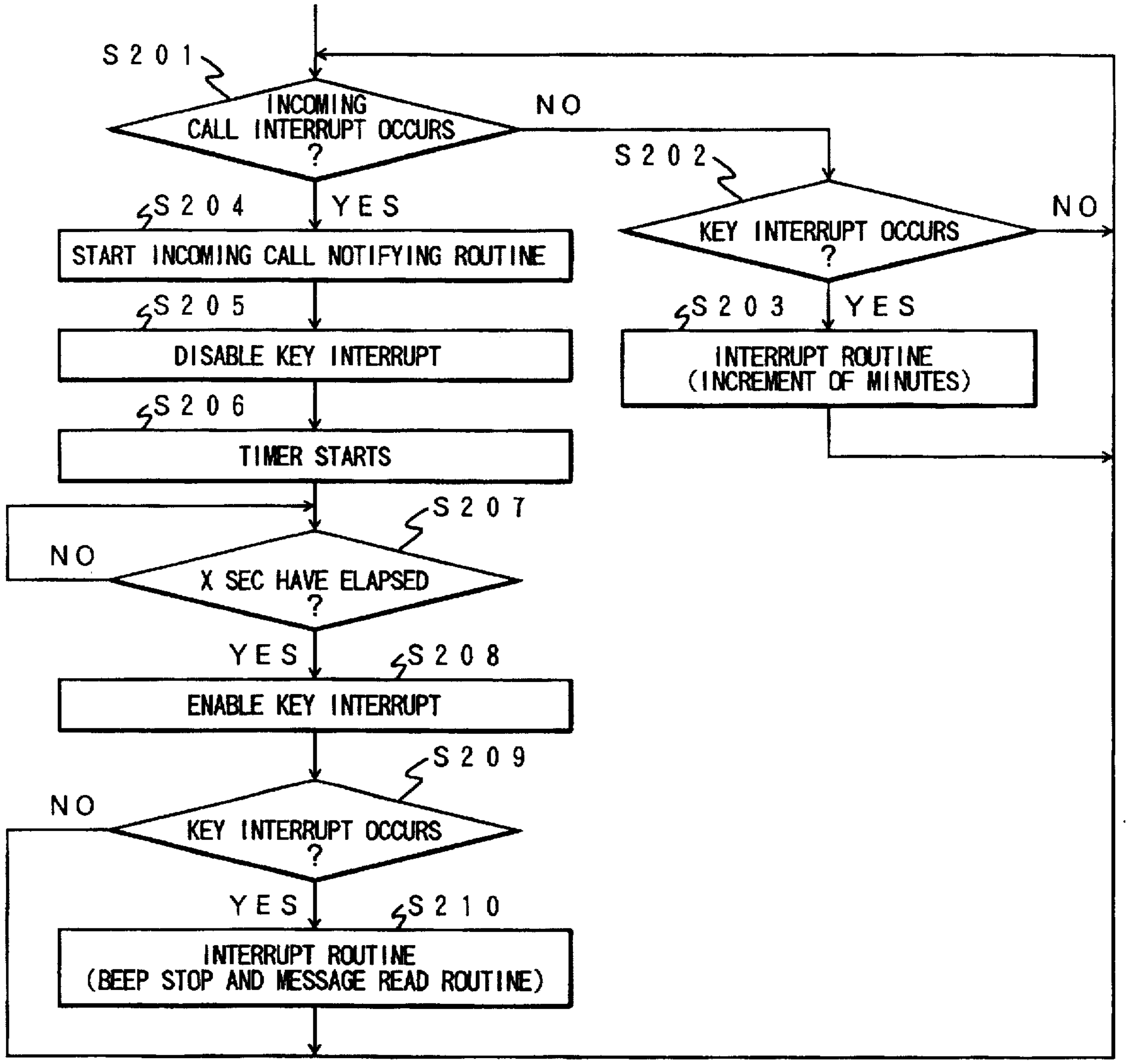
FIG. 3 is a flowchart showing the operation of an interrupt control according to the embodiment.

Referring to FIG. 3, the control processor 103 checks at all times whether an incoming call interrupt and a key interrupt occur with higher priority assigned to the incoming call interrupt. More specifically, it is checked whether an incoming call interrupt occurs (step S201) and , if no incoming call occurs, then checked whether a key interrupt occurs (step S202). Since the user is pressing the key to set the time-of-day clock here, the number of minute digit of the time-of-day clock is incremented each the key is pressed unless an incoming call occurs (step S203 ).

When the received message is input from the decoder 102 to the interrupt controller 104, control is forced to be transferred to an incoming call notifying routine in the progress of setting the time-of-day clock (step S204). After starting the incoming call notifying routine, the control processor 103 disables the key interrupt (step S205) and then starts the timer 110 which is set to X seconds, where X is a value selected from 0.5, 1.0, 1.5, and so on (step S206). Since the key interrupt is ignored during this X-second period, the user's key operation has no effect on the incoming call notifying routine. When the X-second period has passed (YES in step S207), the control processor 103 enables the key interrupt again (step S208). Therefore, when the user presses the key (YES in step S209), the control processor 103 transfers control to a predetermined interrupt routine (step S210). Since the incoming call notifying routine is now performed, the user's key operation causes the alert controller 113 to stop the alert process and then the control processor 103 to read the message from the RAM 109 to display it on the LCD 112.

Figure 4:
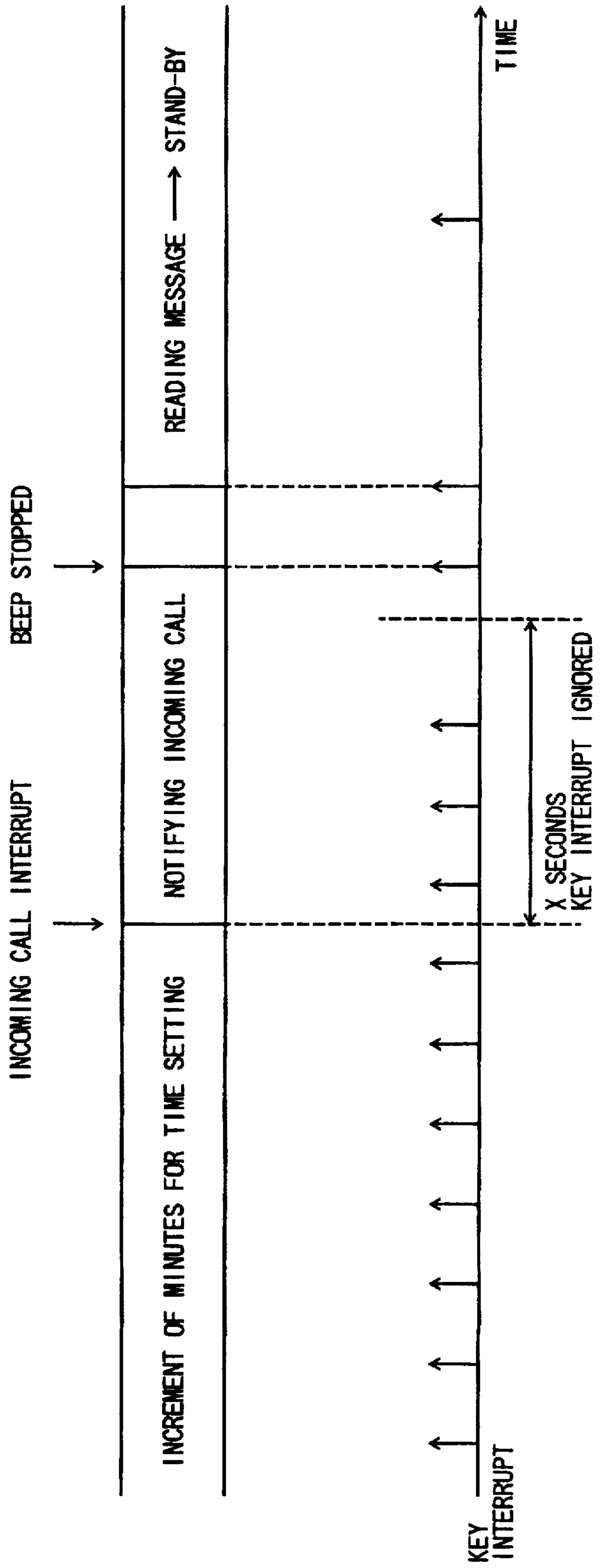
FIG. 4 is a time chart showing an example of the operation of the embodiment.

As illustrated in FIG. 4, in the case where the user is pressing the key again and again to set the time-of-day clock, the control processor 103 starts the incoming call notifying routine at the time when receiving the message from the decoder 102. At the same time, the control processor 103 disables the key interrupt for X seconds during which the user's key operations are ignored, resulting in no effect on the incoming call notifying routine. After the X-second period has elapsed, the control processor 103 enables the key interrupt again, thereby restoring the user's key operations. Therefore, when the user presses the key once just after the X-second period has elapsed, the control processor 103 controls the alert controller 113 so as to stop making a beep. And then the following user's key operations cause the control processor 103 to read the message from the RAM 109 to display it on the LCD 112 and, if all messages have been displayed, then the control processor 103 returns to the stand-by state.

The X-second period during which the user's key operations are ignored is preferably determined so that the user is prevented from mistakenly pressing the key and the beep is stopped as soon as possible. For example, the time period X is set to about 2 seconds.

As described above, according to the present invention, the user's key interrupt is ignored for a predetermined time period after an incoming call is detected. Therefore, the user's misoperation is effectively prevented even when an incoming call suddenly occurs. Since the user can confirm the occurrence of the incoming call before pressing the key to stop the beep and display the received message on screen, the incoming call notifying process is progressed under the control of the user with reliability.

What is claimed is:

1. A selective calling receiver for receiving a selective calling signal, comprising:

input means for inputting an instruction according to a user's manual operation;

detecting means for detecting-an incoming call from the selective calling signal, the incoming call being addressed to the selective calling receiver itself;

notifying means for notifying reception of the incoming call to a user through a predetermined medium; and control means for ignoring the instruction received from the input means during a predetermined time period immediately after the incoming call has been detected.

2. The selective calling receiver according to claim 1, wherein the control means comprises:

first means for receiving a first interrupt request for the incoming call and a second interrupt request for the instruction;

second means for assigning a higher priority to the first interrupt request for the incoming call than the second interrupt request for the instruction; and third means for ignoring the second interrupt request for the instruction during the predetermined time period immediately after the incoming call has been detected.

3. The selective calling receiver according to claim 1, further comprising:

storage means for storing a base program and a plurality of function programs, the base program providing basic operations of the selective calling receiver; and processing means for executing the base program in which the control means is implemented and executing one of the function programs depending on the instruction corresponding to the user's manual operation.

4. The selective calling receiver according to claim 1, wherein the input means comprises a plurality of keys which allow the user's manual operation.

5. The selective calling receiver according to claim 1, wherein the input means comprises a plurality of keys including at least one key which is shared by a plurality of programs among the base program and the function programs.

6. A selective calling receiver comprising:

input means for inputting an instruction according to a user's manual operation;

receiving means for receiving a selective calling signal;

detecting means for detecting an incoming call from the selective calling signal, the incoming call being addressed to the selective calling receiver itself;

notifying means for notifying reception of the incoming call to a user through a predetermined medium;

interrupt control means for assigning a higher priority to a first interrupt of the incoming call than a second interrupt of the instruction and ignoring the second interrupt of the instruction until a predetermined time period has elapsed immediately after the incoming call has been detected; and receiver control means for activating the notifying means from when the incoming call is detected until the second interrupt of the instruction first occurs after the predetermined time period has elapsed.

7. The selective calling receiver according to claim 6, further comprising:

storage means for storing a base program and a plurality of function programs, the base program providing basic operations of the selective calling receiver; and processing means for executing the base program by which the interrupt control means and the receiver control means are implemented therein and executing one of the function programs depending on the instruction corresponding to the user's manual operation.

8. The selective calling receiver according to claim 7, wherein the input means comprises a plurality of keys including at least one key which is shared by a plurality of programs among the base program and the function programs.

9. The selective calling receiver according to claim 6, wherein the receiver control means controls the notifying means such that a message including in the incoming call is displayed on screen when the second interrupt of the instruction secondly occurs after the predetermined time period has elapsed.

10. The selective calling receiver according to claim 7, wherein the receiver control means controls the notifying means such that a message including in the incoming call is displayed on screen when the second interrupt of the instruction secondly occurs after the predetermined time period has elapsed.

11. A receiving control method of a selective calling receiver having a keypad for inputting an instruction according to a user's manual operation, comprising the steps of:

a) detecting an incoming call from the selective calling signal, the incoming call being addressed to the selective calling receiver itself;

b) notifying reception of the incoming call to a user through a predetermined medium; and c) ignoring the instruction received from the keypad during a predetermined time period immediately after the incoming call has been detected.

12. The receiving control method according to claim 11, wherein the step (c) comprises the steps of:

receiving a first interrupt request for the incoming call and a second interrupt request for the instruction;

assigning a higher priority to the first interrupt request for the incoming call than the second interrupt request for the instruction; and ignoring the second interrupt request for the instruction during the predetermined time period immediately after the incoming call has been detected.

13. A receiving control method of a selective calling receiver having a keypad for inputting an instruction according to a user's manual operation, comprising the steps of:

a) detecting an incoming call from a selective calling signal, the incoming call being addressed to the selective calling receiver itself;

b) ignoring the instruction received from the keypad until a predetermined time period has elapsed immediately after the incoming call has been detected; and c) notifying reception of the incoming call to a user through a predetermined medium from when the incoming call is detected until the instruction first occurs after the predetermined time period has elapsed.

14. The receiving control method according to claim 13, wherein the step (c) further comprises the step of displaying a message including in the incoming call on screen when the instruction secondly occurs after the predetermined time period has elapsed.

15. The receiving control method according to claim 13, further comprising the step of assigning a higher priority to a first interrupt of the incoming call than a second interrupt of the instruction.

16. A receiving control method of a selective calling receiver having a keypad for inputting an instruction according to a user's manual operation, comprising the steps of:

a) detecting an incoming call from a selective calling signal, the incoming call being addressed to the selective calling receiver itself;

b) changing control from a first operation mode determined by the instruction to a second operation mode when the incoming call is detected, the second operation mode providing a first step such that the incoming call is notified to a user through a predetermined medium;

c) ignoring the instruction until a predetermined time period has elapsed immediately after the incoming call is detected; and d) performing the first step from when the incoming call is detected until the instruction first occurs after the predetermined time period has elapsed.

17. The receiving control method according to claim 16, wherein the second operation mode provides a second step of displaying a message including in the incoming call on screen when the instruction secondly occurs after the predetermined time period has elapsed.

* * * * *